United States Patent [19]
Goto et al.

[11] Patent Number: 5,428,967
[45] Date of Patent: Jul. 4, 1995

[54] ELECTRIC CAR AIR-CONDITIONING APPARATUS

[75] Inventors: Naomi Goto, Shiga; Makoto Yoshida; Masafumi Nishimiya, both of Kusatsu, all of Japan

[73] Assignee: Matsushita Electric Industrial Co., Ltd., Osaka, Japan

[21] Appl. No.: 228,013

[22] Filed: Apr. 15, 1994

[30] Foreign Application Priority Data

Apr. 21, 1993 [JP] Japan .................................. 5-094023

[51] Int. Cl.⁶ .......................... F25B 49/00; B60H 1/00
[52] U.S. Cl. ....................................... 62/230; 62/243; 323/901
[58] Field of Search .................. 62/230, 243, 323.3, 62/126, 129, 131, 157, 158; 318/801, 803; 361/22, 30, 31, 33; 307/10.1, 10.7, 31, 33, 35, 109; 323/901; 363/109

[56] References Cited

U.S. PATENT DOCUMENTS

| | | | |
|---|---|---|---|
| 4,227,139 | 10/1980 | Rosink et al. | 318/803 |
| 4,482,854 | 11/1984 | Kawada et al. | 318/801 |
| 4,982,306 | 1/1991 | Koroncai et al. | 323/901 X |
| 5,179,842 | 1/1993 | Kanazawa | 62/230 X |
| 5,209,075 | 5/1993 | Kim | 62/230 X |
| 5,241,255 | 8/1993 | Oshima et al. | 318/801 |

*Primary Examiner*—Harry B. Tanner
*Attorney, Agent, or Firm*—Stevens, Davis, Miller & Mosher

[57] ABSTRACT

An electric car air-conditioning apparatus, which is small in size and capable of preventing abnormal heating upon occurrence of a failure and preventing damage when a capacitor is connected with its polarity reversed, provided with a current-conduction detecting device for detecting the operation of current conduction of a current conducting device for charging the capacitor with a current from a battery, and a power breaking device for breaking a current from the battery, wherein a control section actuates the power breaking device to break the current from the battery in the case where the current-conduction detecting device detects the operation of current conduction for a period longer than a predetermined time when the control section is not outputting a control signal for closing a switching device through which power is supplied from the battery to drive a motor-driven compressor, and in the case where the current-conduction detecting device detects the operation of current conduction when the control section is outputting the control signal for closing the switching device.

2 Claims, 4 Drawing Sheets

ELECTRIC CAR AIR-CONDITIONING APPARATUS

BACKGROUND OF THE INVENTION

1. Field of the Invention

The present invention relates to an electric car air-conditioning apparatus having a motor-driven compressor driven by the power supplied from a battery.

2. Description of the Related Art

The operation of a conventional electric car air-conditioning apparatus will be described with reference to a circuit diagram of a conventional electric car air-conditioning apparatus shown in FIG. 4.

When a battery 2 is connected, a capacitor 11 is charged with a time constant determined by a product of the resistance value of a resistor 8 and the electrostatic capacity value of the capacitor 11. If an input voltage detecting means 7 of a motor-driven compressor driving unit 1 detects a voltage larger than a predetermined value, a switching device 3 is closed by a control section 6 so that power is supplied from the battery 2 through the switching device 3, so that the air-conditioning motor-driven compressor 5 is driven by the motor-driven compressor driving unit 1.

The resistance value of the resistor 8 must be large enough to restrain a charging rush current in order to prevent a fuse 10 from breaking. On the other hand, the resistance value must be small enough so that the fuse 10 is broken upon occurrence of a failure such as damage of the motor-driven compressor driving unit 1 or short-circuiting of the capacitor 11 or the like. Since the fuse 10 must not be broken in a normal operation current, the value of the fuse 10 is set to about 10 A. Accordingly, in order to flow a current about 40 A to break the fuse 10 surely upon occurrence of a failure, the resistance value of the resistor 8 is set to 7.5 ohm when the voltage of the battery 2 is 300 V.

In the above-mentioned circuit, in the case where the fuse 10 does not break at the time of a half-failure of the motor-driven air compressor driving unit 1 or the capacitor 11 or the like, that is, for example, in the case where a current of 9 A flows, the resistor 8 consumes a large power of (9 A)$^2$×7.5 ohm=607.5 W. Accordingly, overheating causes deterioration of reliability such as smoking, solder dissolving, wiring damage, and so on. It is therefore necessary to provide a radiator or the like as a countermeasure to overheating. Accordingly the air-conditioning apparatus becomes large in size.

When the input voltage to the motor-driven compressor driving unit 1 does not rise in the case where the capacitor 11 is connected with its polarity reversed, the input voltage detecting means 7 does not detect the fact that the input voltage has exceeded a predetermined value, so that the control section 6 does not close the switching device 3 and the resistor 8 continues to flow a current into the capacitor 11. On the other hand, even in the case where the capacitor 11 is connected with its polarity reversed directly to the battery 2 and the input voltage to the motor-driven compressor driving unit 1 rises, the input voltage detecting means 7 detects the fact that the input voltage has exceeded the predetermined value and the control section 6 closes the switching device 3. Accordingly, a current continues to flow. As a result, the capacitor 11 is broken, and matters blown out of the capacitor 11 pollutes the air-conditioning apparatus to lower the performance and reliability of the apparatus. The capacitor 11 is a large-size one which has a rated voltage of about 300 V and an electrostatic capacity of about 1000 μF. Accordingly, the failure of the capacitor 11 has a large influence.

Further, if a failure occurs in the switching device 3 or a driving circuit of the switching device 3, the air-conditioning motor-driven compressor 5 is driven by the motor-driven compressor driving unit 1 with the switching device 3 kept not-closed. In this case, the current of the motor-driven compressor 5 flows into the resistor 8. Accordingly there occurs a situation similar to the above-mentioned situation where the fuse 10 does not break.

SUMMARY OF THE INVENTION

It is an object of the present invention to provide an electric car air-conditioning apparatus which is small in size, which is capable of preventing abnormal heating upon occurrence of a failure, and which is capable of preventing damage of a capacitor even when the capacitor is connected with its polarity reversed.

According to a first aspect of the present invention, provided is an electric car air-conditioning apparatus which comprises: a battery having a first terminal and a second terminal; a power breaking device having first and second terminals for breaking its own circuit in accordance with a first control signal, the first terminal of the power breaking device being connected to the first terminal of the battery; a current conducting device having first and second terminals, the first terminal of the current conducting device being connected to the second terminal of the power breaking device; a switching device for making short-circuiting between the first terminal of the power breaking device and the second terminal of the current conducting device in accordance with a second control signal; a capacitor connected between the second terminal of the current conducting device and the second terminal of the battery so that the capacitor is charged by the battery through the current conducting device when the power breaking device is closed; a current-conduction detecting device for detecting a current flowing in the current conducting device so as to output a current-conduction detection signal; and a motor-driven compressor driving unit which includes: means connected in parallel to the capacitor to detect a voltage across the capacitor so as to output the second control signal for actuating the switching device to make the short-circuiting when the detected voltage is larger than a predetermined value, and for outputting the first control signal for making the power breaking device break its own circuit in either one of a case where the current-conduction detection signal continues to exist for a duration not shorter than a predetermined time while the second control signal is not being outputted, and a case where the current-conduction detection signal exists while the second control signal is being outputted; and means for driving an air-conditioning motor-driven compressor by use of power supplied from the battery through the switching device.

According to a second aspect of the present invention, provided is an electric car air-conditioning apparatus which comprises: a battery having a first terminal and a second terminal; a current conducting device having first and second terminals, the first terminal of the current conducting device being connected to the first terminal of the battery; a switching device connected in parallel to the current conducting device for making short-circuiting between the first and second terminals of the current conducting device in accordance with a control signal; a capacitor connected between the second terminal of the current conducting device and the second terminal of the battery so that the capacitor is charged by the battery through the current conducting device; a switching device operation detecting device for detecting open/close of the switching device so as to output an open/close detection signal indicating a result of detection; and a motor-driven compressor driving unit which includes: means connected in parallel to the capacitor to detect a voltage across the capacitor so as to output the control signal for actuating the switching device to make the short-circuiting when the detected voltage is higher than a predetermined value; and means for driving an air-conditioning motor-driven compressor by use of power supplied from the battery through the switching device only in a case where the open/close detection signal indicates a fact that the circuit of the switching device is being closed.

In the electric car air-conditioning apparatus according to the first aspect of the present invention, a control section actuates the power breaking device to break the current from the battery in the case where the current-conduction detecting device detects the operation of current conduction for a period longer than a predetermined time when the control section is not outputting a control signal for closing the switching device through which power is supplied from the battery to drive a motor-driven compressor, and in the case where the current-conduction detecting device detects the operation of current conduction when the control section is outputting the control signal for closing the switching device.

In the period in which the control section is not outputting a control signal for closing the switching device, the current conducting device is charging the capacitor with a current supplied from the battery. At this time, the current-conduction detecting device detects the operation of current conduction of the current conducting device. This current conduction is performed for a predetermined time which is necessary for charging. However, there is a possibility that this current conduction continues beyond the predetermined time. This is a case where a half-failure occurs in the motor-driven compressor driving unit or the capacitor or the like so that a fuse is not broken and a current is left to flow continuously, or a case where the capacitor is connected with its voltage polarity reversed so that a current is left flowing or the like. In such a case where the current conduction continues beyond the predetermined time, the control section actuates the power breaking device to break a current from the battery. Accordingly, there occurs no deterioration of reliability, such as smoking, solder dissolving, wiring damage, and so on, caused by overheating of the current conducting device due to the half-failure of the motor-driven compressor driving unit or the capacitor or the like. It is therefore unnecessary to provide a radiator as a countermeasure to overheating, and it is therefore possible to prevent the air-conditioning apparatus from becoming large in size. In addition, there is no case where the capacitor is broken due to connection of the capacitor with its polarity reversed. Accordingly, there is no case where matters blown out of the broken capacitor pollute the air-conditioning apparatus to thereby deteriorate the performance and reliability of the apparatus. Accordingly, it is possible to realize an electric car air-conditioning apparatus which is small in size, in which abnormal heating can be prevented from occurring upon occurrence of a failure, and in which damage can be prevented from occurring when the capacitor is connected with its polarity reversed.

When the control section is outputting a control signal to close the switching device, the switching device should be closed so that no current flows into the current conducting device because the switching device is connected in parallel to the current conducting device. In this case, however, there is a possibility that the current-conduction detecting device detects the operation of current conduction. That is the case where a failure occurs in the switching device or in a driving circuit of the switching device. The control section detects only the fact that an input voltage exceeds a predetermined by means of the input voltage detecting means so that the control section outputs a control signal for closing the switching device to thereby make the motor-driven compressor driving unit drive the air-conditioning motor-driven compressor. When the current-conduction detecting device detects the operation of current conduction, the control section actuates the power breaking device to break a current from the battery. Accordingly, if a failure is caused in the switching device or the driving circuit of the switching device, there occurs no deterioration of reliability, such as smoking, solder dissolving, wiring damage, or the like, caused by overheating of the current conducting device caused by the fact that the motor-driven compressor is driven as the switching device is left not-closed so that the current of the motor-driven compressor flows into the current conducting device. It is therefore unnecessary to provide a radiator as a countermeasure to overheating, so that the air-conditioning apparatus does not become large in size. Accordingly, it is possible to realize an electric car air-conditioning apparatus which is small in size, and in which abnormal heating can be prevented from occurring upon occurrence of a failure.

In the electric car air-conditioning apparatus according to the second aspect of the present invention, the motor-driven compressor driving unit drives the motor-driven compressor only when the switching device operation detecting device detects that the switching device is closed.

As mentioned above, in the case where a failure occurs in the switching device or the driving circuit of the switching device, the control section detects only the fact that an input voltage exceeds a predetermined value by means of the input voltage detecting means so that the control section outputs a control signal for closing the switching device to thereby make the motor-driven compressor driving unit drive the air-conditioning motor-driven compressor. Accordingly, if a failure occurs in the switching device or the driving circuit of the switching device, the motor-driven compressor is driven by the motor-driven compressor driving unit in a condition where the switching device is not closed. Therefore the switching device operation detecting device for detecting the operation of the switching device which supplies the power to drive the motor-driven compressor from the battery is provided so that the motor-driven compressor driving unit drives the motor-driven compressor only when the switching device operation detecting device detects the fact that the switching device is closed. Accordingly, in the case where a failure occurs in the switching device or the driving circuit of the switching device, there occurs no deterioration of reliability, such as smoking, solder dissolving, wiring damage, or the like, caused by overheating of the current conducting device due to the fact that the motor-driven compressor is driven in the condition that the switching device is left not-closed so that the current of the motor-driven compressor flows into the current conducting device. It is therefore unnecessary to provide a radiator as a countermeasure to overheating, so that the air-conditioning apparatus does not become large in size. Accordingly, it is possible to realize an electric car air-conditioning apparatus which is small in size, and by which abnormal heating upon occurrence of a failure can be prevented.

DESCRIPTION OF THE PREFERRED EMBODIMENTS

Embodiments of the present invention will be described with reference to the drawings.

Figure 1:
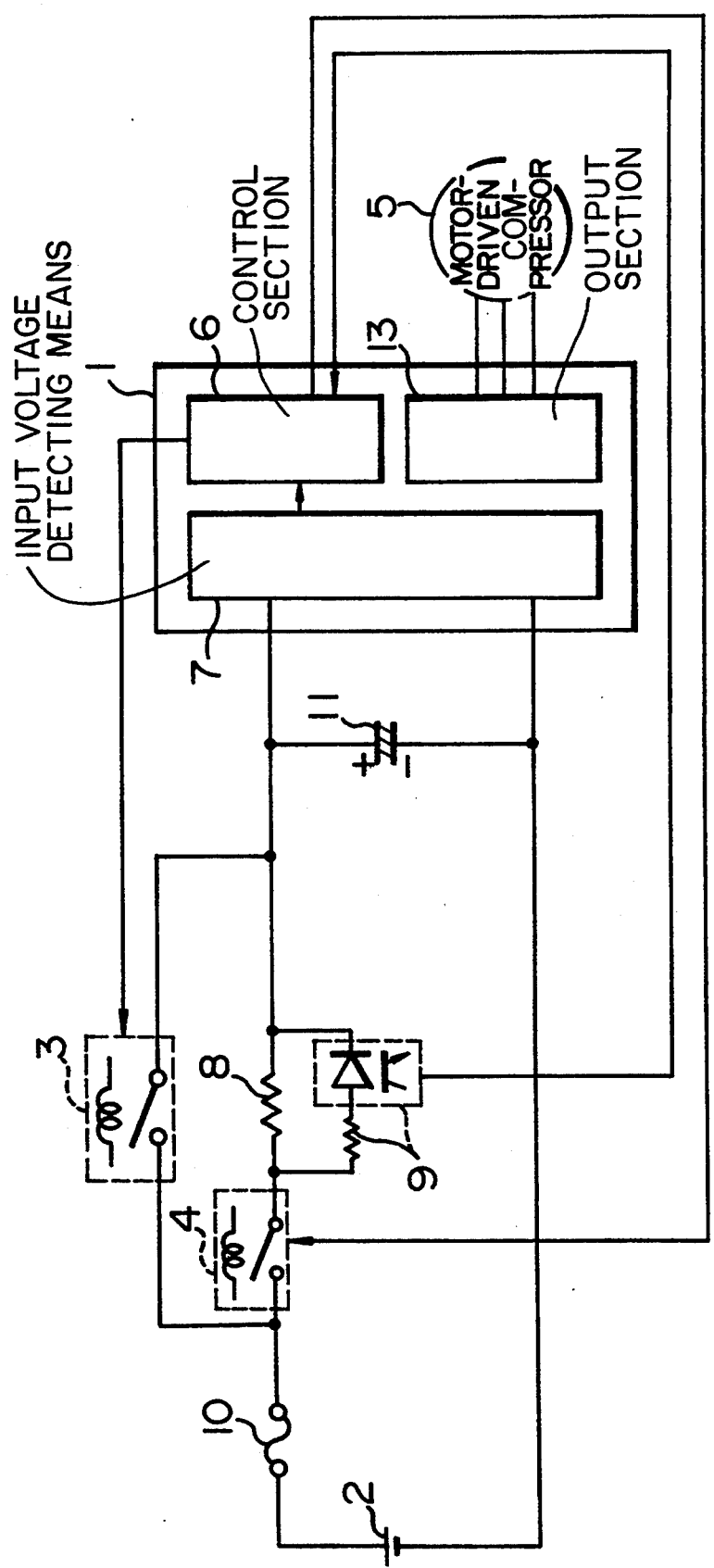
FIG. 1 is a circuit diagram illustrating an electric car air-conditioning apparatus according to a first embodiment of the present invention.
Figure 4:
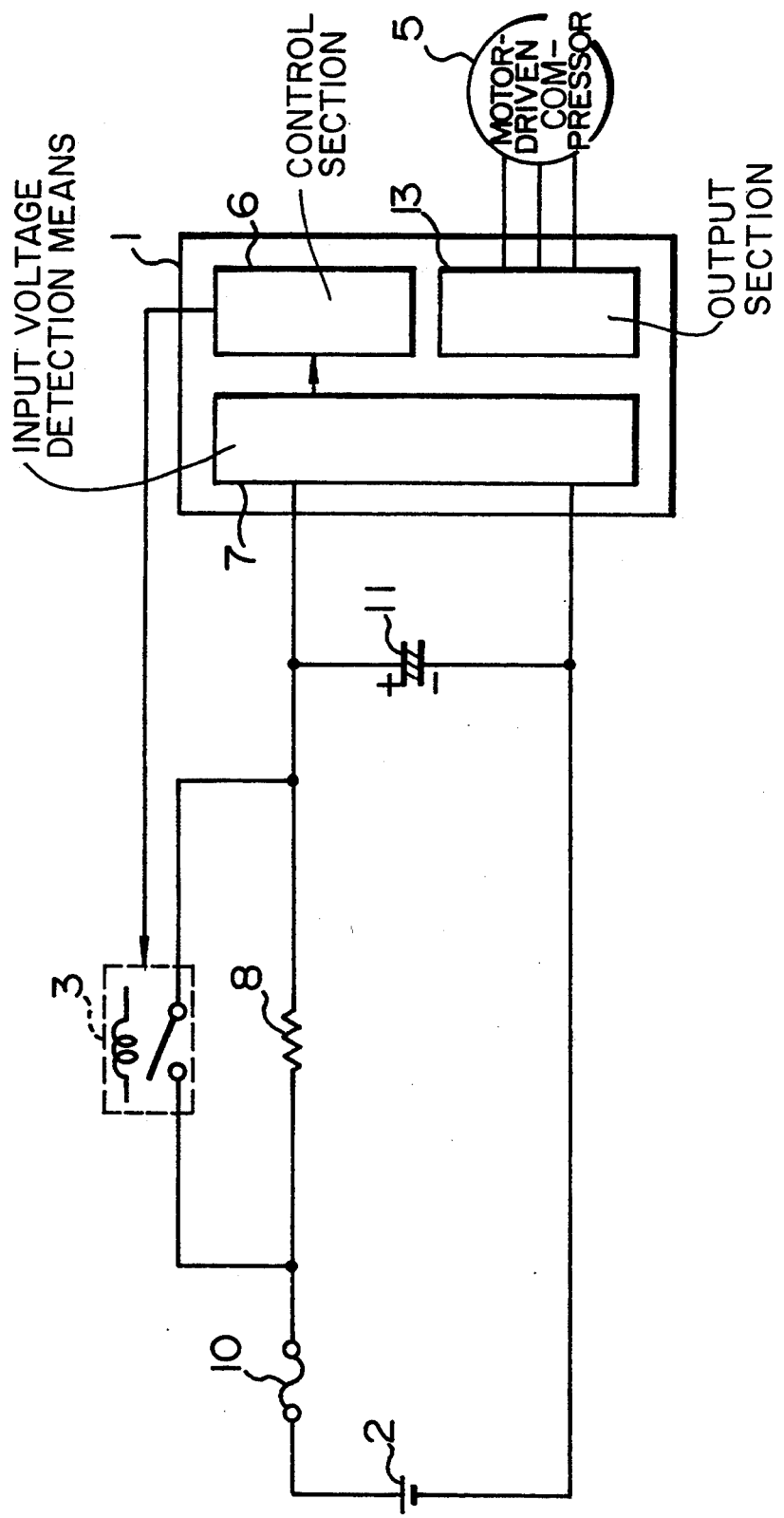
FIG. 4 is a circuit diagram illustrating a conventional electric car air-conditioning apparatus.

FIG. 1 shows a circuit diagram of an electric car air-conditioning apparatus according to a first embodiment of the present invention. The first embodiment is different from the conventional electric car air-conditioning apparatus shown in FIG. 4 in a point that a current-conduction detecting device 9 is connected in parallel to a resistor 8, and the output of the current-conduction detecting device 9 is connected to a control section 6. In addition, a power breaking device 4 is connected in series to a battery 2 and a fuse 10, and the input of the power breaking device 4 is connected to the control section 6.

The operation of the circuit will be described. In the case of normal operation, if the battery 2 is connected, a capacitor 11 is charged with a time constant depending on the product of the resistance value of the resistor 8 and the electrostatic capacity value of the capacitor 11. Then, if an input voltage detecting means 7 of a motor-driven compressor driving unit 1 detects a voltage larger than a predetermined value, a switching device 3 is closed by the control section 6. Accordingly, supplied with power through the switching device 3 from the battery 2, the motor-driven compressor driving unit 1 drives an air-conditioning motor-driven compressor 5. Assume now that the voltage of the battery 2 is set to 300 V, the rated value of the fuse 10 is set to 10 A, the resistance value of the resistor 8 is set to 7.5 ohm, and the electrostatic capacity of the capacitor 11 is set to 1,000 μF. In addition, assume that the predetermined value of the voltage detected by the input voltage detecting means 7 is set to 259 V (86.5%) which is a voltage value reached after 15 ms, the time twice as long as the time constant 7.5 ms. Because of scattering or the like of the time constant or the voltage of the battery 2, in spite of the normal state of the operation, in some cases the power breaking device 4 operates before the input voltage detecting means 7 detects a voltage not lower than the predetermined value. In order to prevent such a maloperation of the power breaking device 4, the predetermined value concerning the current conduction of the resistor 8 and detected by the current-conduction detecting device 9 is set to 30 ms which is four times as long as the time constant 7.5 ms.

Assume now that a half-failure occurs in the motor-driven air compressor driving unit 1 and the resistance value of the motor-driven compressor driving unit 1 is 25.8 ohm when the control section 6 is not outputting a control signal for closing the switching device 3, that is, when the capacitor 11 is being charged. At this time, a current of:

$$300\ V \div (7.5\ ohm + 25.8\ ohm) = 9\ A$$

flows into the resistor 8. The power consumption of the resistor 8 becomes:

$$(9\ A)^2 \times 7.5\ ohm = 607.5\ W$$

The input voltage of the motor-driven compressor driving unit 1 becomes:

$$300\ V - 7.5\ ohm \times 9\ A = 232.5\ V.$$

Therefore, a current flowing in the resistor 8 is 9 A which is smaller than the rated value 10 A of the fuse 10, so that the fuse 10 does not break. In addition, the input voltage of the motor-driven compressor driving unit 1 is lower than the predetermined voltage 259 V detected by the input voltage detecting means 7. Accordingly, the control section 6 does not close the switching device 3, so that the current of 9 A continues to flow in the resistor 8. The voltage 67.5 V = 7.5 ohm × 9 A continues to be produced across the opposite ends of the resistor 8. Accordingly, in the current-conduction detecting device 9 constituted by a series connection of a resistor and a photocoupler, the voltage 67.5 V is applied across the opposite ends of the series connection, so that the LED of the photocoupler is lighted and a photo-transistor of an output section is turned on. Accordingly, the control section 6 decide that the resistor 8 is brought into a state of current-conduction, and counts the time of the current-conduction. If the time exceeds the predetermined time of 30 ms, the control section 6 actuates the power breaking device 4 so that the power breaking device 4 operates to stop the current applied to the resistor 8. Also in the case where the capacitor 11 has a half-failure, or is connected with its polarity reversed, a current continues to flow into the resistor 8 and the power breaking device 4 operates in the same manner as mentioned above. Therefore, there occurs no deterioration of reliability, such as smoking, solder dissolving, wiring damage, and so on, caused by overheating of the resistor 8 due to the half-failure of the motor-driven compressor driving unit 1 or the capacitor 11 or the like. It is therefore unnecessary to provide a radiator as a countermeasure to overheating, so that it is possible to prevent the air-conditioning apparatus from becoming large in size. In addition, there is no case where the capacitor 11 is broken due to the fact that the capacitor 11 is connected with its polarity reversed. Accordingly, there is no case where matters blown out of the broken capacitor 11 pollute the air-conditioning apparatus to thereby deteriorate the performance and reliability.

Assume now that a failure occurs in the switching device 3 when the control 6 is outputting a control signal to close the switching device 3, that is, when the input voltage detecting means 7 of the motor-driven air compressor driving unit 1 detects a voltage larger than a predetermined value so that the motor-driven compressor driving unit drives the air-conditioning motor-driven compressor 5. At this time, a current of several amperes is made to flow into the resistor 8 by the motor-driven air compressor 5, a voltage is generated across the opposite ends of the resistor 8 and the current-conduction detecting device 9 operates in the same manner as mentioned above. Then, the control section 6 decides that the resistor 8 is brought into a state of current conduction, and actuates the power breaking device 4 immediately so that the power breaking device 4 operates to stop the current applied to the resistor 8. Also in the case where a failure occurs in the driving circuit of the switching device 3, the power breaking device 4 operates in the same manner. Accordingly, in the case where a failure occurs in the switching device 3 or the driving circuit of the switching device 3, there occurs no deterioration of reliability, such as smoking, solder dissolving, wiring damage, or the like, caused by the fact that the motor-driven compressor 5 is driven in the condition that the switching device 3 is left not-closed so that the current of the motor-driven compressor 5 flows into the current conducting device. It is therefore unnecessary to provide a radiator as a countermeasure to overheating, so that it is possible to prevent the air-conditioning apparatus from becoming large in size.

Figure 2:
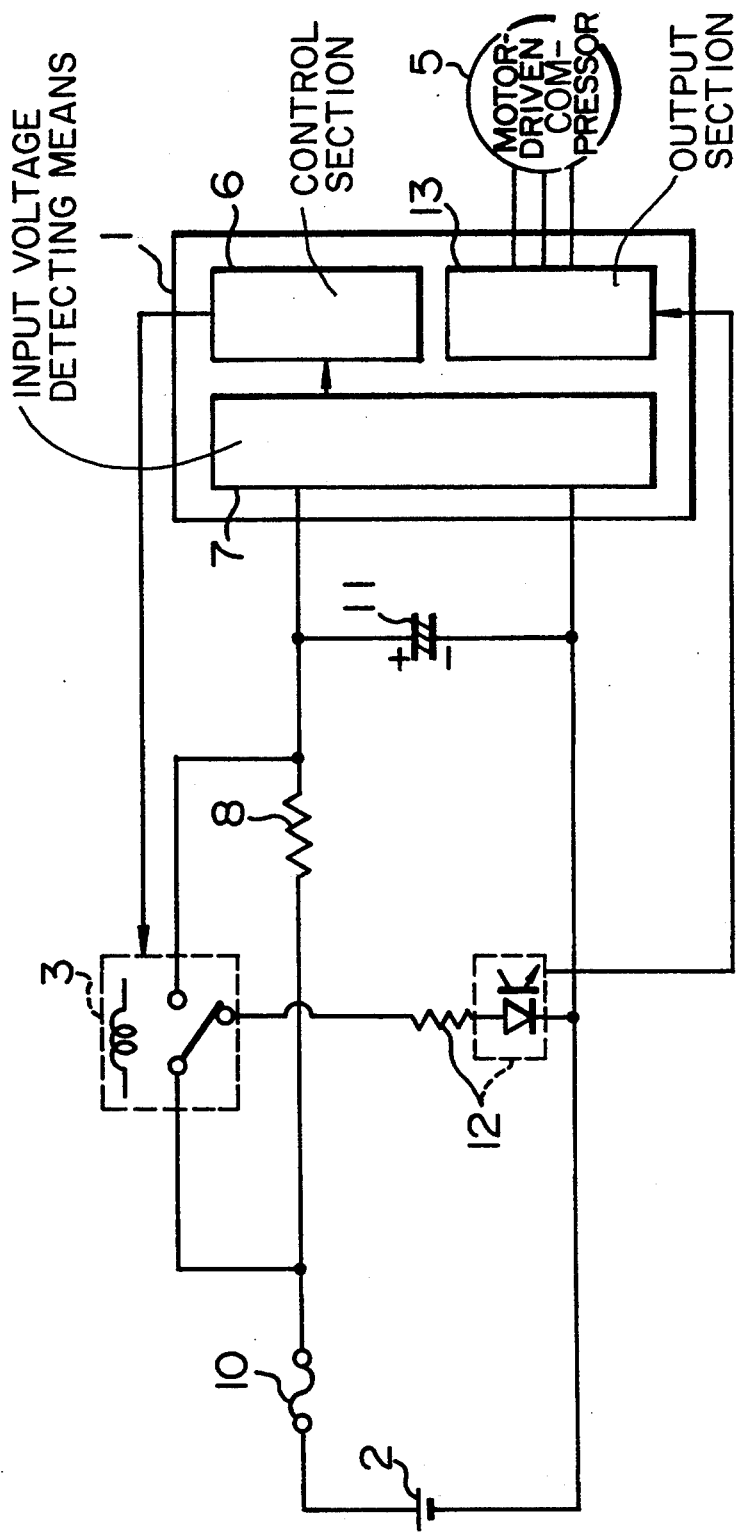
FIG. 2 is a circuit diagram illustrating an electric car air-conditioning apparatus according to a second embodiment of the present invention.

FIG. 2 shows a circuit diagram of an electric car air-conditioning apparatus according to a second embodiment of the present invention. This embodiment is different from the configuration of the conventional electric car air-conditioning apparatus shown in FIG. 4 in a point that a switching device 3 has two relay contacts one of which is connected to a switching device operation detecting device 12.

The operation of the circuit will be described. In the case of normal operation, when a battery 2 is connected, a capacitor 11 is charged with a time constant depending on the product of the resistance value of a resistor 8 and the electrostatic capacity value of the capacitor 11. If an input voltage detecting means 7 of a motor-driven compressor driving unit 1 detects a voltage larger than a predetermined value, the switching device 3 is closed by a control section 6. In the switching device operation detecting device 12 constituted by a series connection of a resistor and a photocoupler, a voltage is not applied across the opposite ends of the series connection of an LED of the photocoupler and the resistor, so that the LED of the photocoupler is not lighted, and a photo-transistor of an output section 13 is left off. Accordingly, the output section 13 decides that the switching device 3 is closed. Therefore, by use of the power supplied from the battery 2 through the switching device 3, an air-conditioning motor-driven compressor 5 is driven by the motor-driven compressor driving unit 1.

Assume now that a failure occurs in the switching device 3 so that the switching device 3 is not closed when the control 6 is outputting a control signal to close the switching device 3, that is, when the input voltage detecting means 7 of the motor-driven compressor driving unit 1 detects a voltage larger than a predetermined value so that the motor-driven compressor driving unit 1 will drive the air-conditioning motor-driven compressor 5. That is, the switching device 3 is connected as shown in FIG. 2. At this time, the voltage of the battery 2 is applied through a fuse 10 to the series connection of the LED and resistor of the photocoupler constituting the switching device operation detecting device 12. Then the LED is lighted, and the photo-transistor of the output section is turned on. Accordingly, the motor-driven compressor 5 is not driven. Also in the case where a failure occurs in the driving circuit of the switching device 3, the motor-driven compressor 5 is not driven. Accordingly, in the case where a failure occurs in the switching device 3, or the driving circuit of the switching device 3, there occurs no deterioration of reliability, such as smoking, solder dissolving, wiring damage, or the like, caused by the fact that the motor-driven compressor 5 is driven in the state where the switching device 3 is left not-closed so that the current of the motor-driven compressor 5 flows into the current conducting device. It is therefore unnecessary to provide a radiator as a countermeasure to overheating, so that it is possible to prevent the air-conditioning apparatus from becoming large in size.

Figure 3:
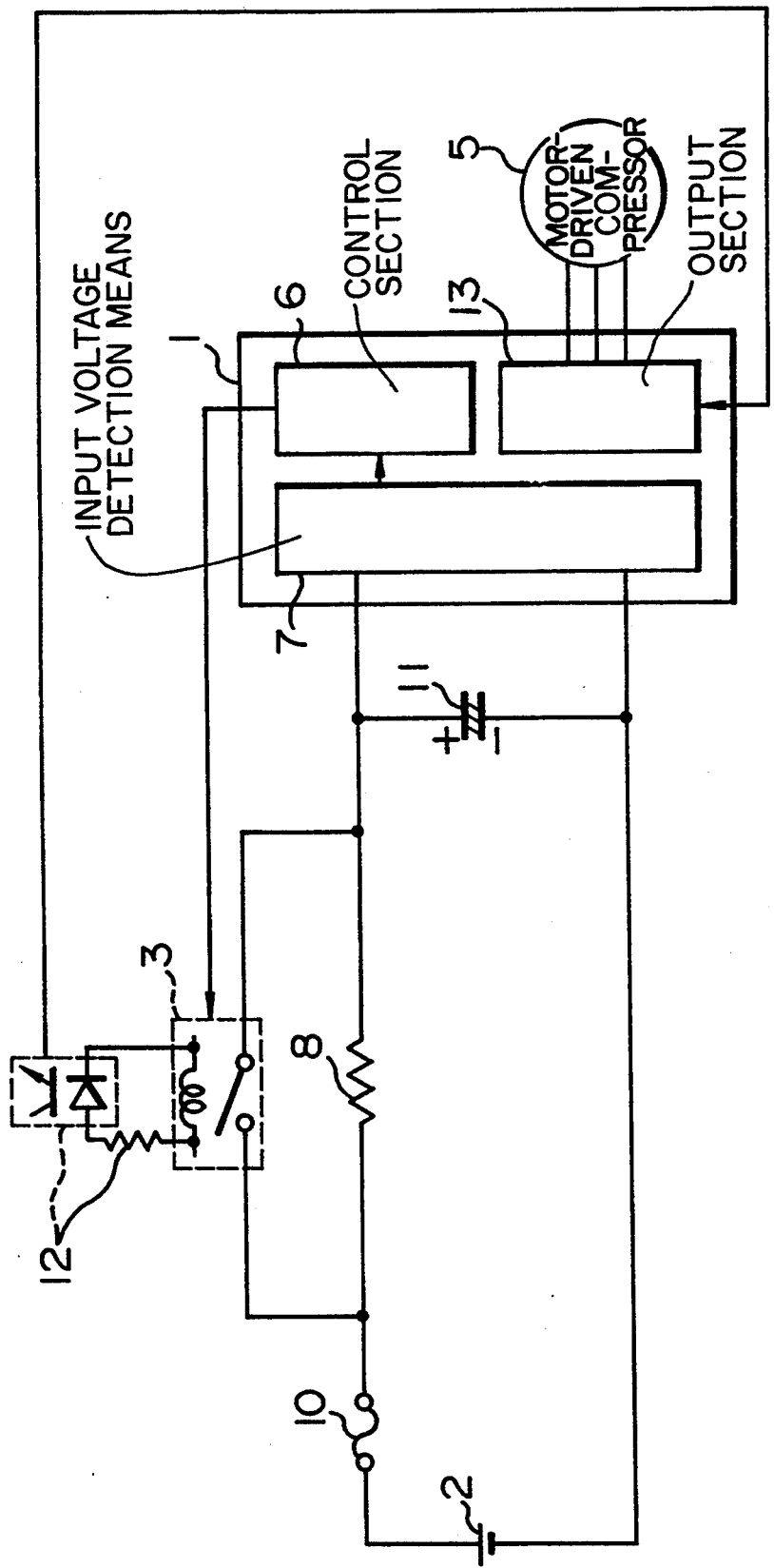
FIG. 3 is a circuit diagram illustrating an electric car air-conditioning apparatus according to a third embodiment of the present invention.

FIG. 3 shows a circuit diagram of an electric car air-conditioning apparatus according to a third embodiment of the present invention. Here, another example of a method of detecting the operation of the switching device 3 is shown. The series connection of the LED and resistor of the photocoupler constituting the switching device operation detecting device 12 is connected in parallel to a relay coil of the switching device 3. Accordingly, in the case where a failure occurs in the driving circuit of the switching device 3, no voltage is applied across the relay coil, so that no voltage is applied to the opposite ends of the series connection of the LED and resistor of the photocoupler. The LED is not lighted, and the photo-transistor of the output section is turned off. Therefore, in the case mentioned above, the motor-driven compressor 5 is not driven if the output section 13 is made to decide that the switching device 3 is open. Thus, it is possible to obtain a similar effect.

Although the switching device 3 and the power breaking device 4 are relays in the above three embodiments, they can be realized by transistors, thyristors, or the like. Although the current conducting device is a resistor, it can be realized by a transistor or the like. Various methods can be applied to other sections within the scope of the present invention.

As is apparent from the above embodiments, in the electric car air-conditioning apparatus according to the first aspect of the present invention, in the case where current conduction continues for a period longer than a predetermined time, for example, in the case where a half-failure occurs in the motor-driven compressor driving unit or the capacitor or the like, in the case where the capacitor is connected with its polarity reversed, or in other similar cases, the control section actuates the power breaking device to break a current from the battery. Accordingly there occurs no deterioration of reliability, such as smoking, solder dissolving, wiring damage, or the like, caused by overheating of the current conducting device due to the half-failure of the motor-driven compressor driving unit, the capacitor or the like. It is therefore unnecessary to provide a radiator as a countermeasure to overheating, so that it is possible to prevent the air-conditioning apparatus from becoming large in size. In addition, there is no case where the capacitor is broken due to the connection of the capacitor its polarity reversed. Accordingly, there is no case where matters blown out of the broken capacitor pollute the air-conditioning apparatus to thereby deteriorate the performance and reliability. Accordingly it is possible to realize an electric car air-conditioning apparatus which is small in size, in which abnormal heating can be prevented from occurring upon occurrence of a failure, and in which damage can be prevented from occurring also when a capacitor is connected with its polarity reversed.

On the other hand, even when the control section outputs a control signal to close the switching device, if a failure occurs in the switching device or in the driving circuit of the switching device, the air-conditioning motor-driven compressor is driven by the motor-driven compressor driving unit in the condition where the switching device is left not-closed. Therefore, when the current-conduction detecting device detects the operation of current conduction, the control section actuates the power breaking device to break a current from the battery. Accordingly, if a failure occurs in the switching device or in the driving circuit of the switching device, there occurs no deterioration of reliability, such as smoking, solder dissolving, wiring damage, or the like, caused by overheating of the current conducting device due to the fact that the motor-driven compressor is driven in the condition that the switching device is left not-closed so that the current of the motor-driven compressor flows into the current conducting device. It is therefore unnecessary to provide a radiator as a countermeasure to overheating, so that the air-conditioning apparatus does not become large in size. Accordingly it is possible to realize an electric car air-conditioning apparatus which is small in size, and in which abnormal heating can be prevented from occurring upon occurrence of a failure.

In the electric car air-conditioning apparatus according to the second aspect of the present invention, even if the control section outputs a control signal to close the switching device, in the case where a failure occurs in the switching device or in the driving circuit of the switching device, the motor-driven compressor is driven by the motor-driven compressor driving unit in the condition that the switching device is left not-closed. In order to prevent this, the switching device operation detecting device for detecting the operation of the switching device which supplies the power to drive the motor-driven compressor from a battery is provided. Consequently the motor-driven compressor driving unit is made to drive the motor-driven compressor only when the switching device operation detecting device detects the fact that the switching device is closed. Accordingly, in the case where a failure occurs in the switching device, or in the driving circuit of the switching device, there occurs no deterioration of reliability, such as, smoking, solder dissolving, wiring damage, or the like, caused by overheating of the current conducting device due to the fact that the motor-driven compressor is driven in the condition that the switching device is left not-closed so that the current of the motor-driven compressor flows into the current conducting device. It is therefore unnecessary to provide a radiator as a countermeasure to overheating, so that the air-conditioning apparatus does not become large in size. Accordingly it is possible to realize an electric car air-conditioning apparatus which is small in size, and in which abnormal heating can be prevented from occurring upon occurrence of a failure.

We claim:

1. An electric car air-conditioning apparatus comprising:
    a battery having a first terminal and a second terminal;
    a power breaking device having first and second terminals for breaking its own circuit in accordance with a first control signal, said first terminal of said power breaking device being connected to said first terminal of said battery;
    a current conducting device having first and second terminals, said first terminal of said current conducting device being connected to said second terminal of said power breaking device;
    a switching device for making short-circuiting between said first terminal of said power breaking device and said second terminal of said current conducting device in accordance with a second control signal;
    a capacitor connected between said second terminal of said current conducting device and said second terminal of said battery so that said capacitor is charged by said battery through said current conducting device when said power breaking device is closed;
    a current-conduction detecting device for detecting a current flowing in said current conducting device so as to output a current-conduction detection signal; and
    a motor-driven compressor driving unit including:
        means connected in parallel to said capacitor to detect a voltage across said capacitor so as to output said second control signal for actuating said switching device to make said short-circuiting when said detected voltage is larger than a predetermined value, and for outputting said first control signal for making said power breaking device break its own circuit in either one of a case (a) where said current-conduction detection signal continues to exist for a duration not shorter than a predetermined time while said second control signal is not being outputted, and a case (b) where said current-conduction detection signal exists while said second control signal is being outputted; and
        means for driving an air-conditioning motor-driven compressor by use of power supplied from said battery through said switching device.

2. An electric car air-conditioning apparatus comprising:
    a battery having a first terminal and a second terminal;
    a current conducting device having first and second terminals, said first terminal of said current conducting device being connected to said first terminal of said battery;
    a switching device connected in parallel to said current conducting device for making short-circuiting between said first and second terminals of said current conducting device in accordance with a control signal;
    a capacitor connected between said second terminal of said current conducting device and said second terminal of said battery so that said capacitor is charged by said battery through said current conducting device;
    a switching device operation detecting means for detecting open/close of said switching device so as to output an open/close detection signal indicating a result of detection; and a motor-driven compressor driving unit including:
    means connected in parallel to said capacitor to detect a voltage across said capacitor so as to output said control signal for actuating said switching device to make said short-circuiting when said detected voltage is higher than a predetermined value; and means for driving an air-conditioning motor-driven compressor by use of power supplied from said battery through said switching device only in a case where said open/close detection signal indicates a fact that the circuit of said switching device is being closed.

* * * * *